United States Patent [19]
Foster

[11] Patent Number: 5,494,130
[45] Date of Patent: Feb. 27, 1996

[54] ANTI-THEFT AND ANTI-HIJACKING SYSTEM FOR MOTOR VEHICLES

[76] Inventor: Peter J. Foster, 3210 Azahar Pl., Carlsbad, Calif. 92009

[21] Appl. No.: 333,419

[22] Filed: Nov. 2, 1994

[51] Int. Cl.⁶ ................................................ B60R 25/00
[52] U.S. Cl. ........................................ 180/287; 180/273
[58] Field of Search .................................. 180/270, 273, 180/287, 289

[56] References Cited

U.S. PATENT DOCUMENTS

| | | | |
|---|---|---|---|
| 4,928,506 | 5/1990 | Radziewicz | 70/176 |
| 4,991,683 | 2/1991 | Garretto et al. | 180/287 |
| 5,045,837 | 9/1991 | Gosker | 180/287 |
| 5,193,641 | 3/1993 | Durrell | 180/287 |
| 5,307,048 | 4/1994 | Sonders | 180/287 |
| 5,335,748 | 8/1994 | Wilson | 180/270 |

*Primary Examiner*—Kenneth R. Rice
*Attorney, Agent, or Firm*—Stetina Brunda & Buyan

[57] ABSTRACT

A system for preventing theft and hijacking of a motor vehicle. The system comprises a fuel cut-off valve operative to prevent the flow of fuel to the vehicle engine. The fuel cut-off valve is in communication with the vehicle ignition such that activation of the vehicle ignition will cause the fuel cut-off valve to close, unless a vehicle run switch is actuated contemporaneous with or immediately after the vehicle ignition. The vehicle run switch is preferably concealed from view and/or coded and/or keyed to limit its accessibility to only authorized operators of the vehicle. Additionally, to prevent hijacking, the system incorporates a driver's heat sensor capable of sensing when a human body is seated in the driver's seat. When the sensor determines that the driver's body has been removed from the driver's seat for more than a minimum time period (e.g., 3 seconds) a controller/timer will begin timing a predetermined delay period. At the end of the delay period, the controller/timer will cause the fuel cut-off valve to stop the flow of fuel to the vehicle engine, thereby stalling the engine. The delay period is preferably long enough to allow the vehicle to be driven a safe distance away from the scene of the hijacking.

46 Claims, 3 Drawing Sheets

ANTI-THEFT AND ANTI-HIJACKING SYSTEM FOR MOTOR VEHICLES

FIELD OF THE INVENTION

The present invention pertains generally to automotive accessories and more particularly to a passive anti-theft and anti-hijack system capable of rendering a motor vehicle inoperable or un-driveable so as to prevent a thief or hijacker from absconding with the vehicle.

BACKGROUND OF THE INVENTION

The long-standing problem of auto theft has inspired the development of numerous motor vehicle alarm systems and anti-theft devices intended to prevent unattended vehicles from being burglarized or stolen. Many of the alarm systems and anti-theft devices of the prior art are intended to be deactuated while the vehicle engine is running and, thus, are operative only while the motor vehicle is parked.

Some of the anti-theft systems of the prior art have utilized fuel cut-off valves which operate to disrupt the flow of fuel to the vehicle engine, thereby rendering the vehicle inoperative. In particular, U.S. Pat. No. 4,928,506 (Radiewicz), entitled, Anti-Theft Locking Valve For Motor Vehicles describes a vehicle anti-theft system which incorporates a manually-operated cut-off valve disposed in the fuel line or brake fluid line of the vehicle, to prevent fuel or brake fluid from flowing through the line when the system is activated. The system of U.S. Pat. No. 4,928,506 may be manually actuated at the time the vehicle is parked. Thereafter, if a thief attempts to start the vehicle, the fuel cut-off valve will prevent fuel from flowing to the engine of the vehicle, thereby allowing the engine to run only until the fuel remaining within the fuel line, between the cut-off valve and the engine, has been exhausted.

The problem of automobile hijacking is of growing concern, especially in major metropolitan areas of the United States. Typically, such motor vehicle hijackings occur while the motor vehicle is running, and while any alarm or anti-theft system which may be installed in the motor vehicle is deactuated. In this regard, hijackers of motor vehicles are often able to simply drive away in the already-running motor vehicle, leaving its rightful owner behind.

Although the vehicle alarm and anti-theft systems of the prior art may serve to deter or prevent the theft of motor vehicles which are parked and unattended, such prior art alarms and anti-theft systems are typically of little or no value in preventing the hijacking of motor vehicles which are already running, with the ignition key inserted in the ignition. Accordingly, there remains a need in the art for a vehicle anti-theft and anti-hijack system which is capable of preventing, not only theft of a parked or unattended motor vehicle, but also the hi-jacking of such motor vehicle during its routine operation or use.

SUMMARY OF THE INVENTION

The present invention provides anti-theft and anti-hijack system(s) for motor vehicles. A cut-off valve is disposed in the fuel line or other appropriate fluid-flow or electrical line of the motor vehicle such that closure of the cut-off valve will prevent the vehicle engine from running. A vehicle run switch is located in the passenger compartment of the vehicle and is preferably hidden from view, coded or keyed so as to be actuatable only by the authorized owner/operator of the vehicle. A controller/timer is connected to or communicative with, the vehicle electrical system, the fuel cut-off valve, and the vehicle run switch. The cut-off valve is connected to or in communication with the vehicle ignition such that, when the ignition is actuated, the cut-off valve will close unless the vehicle run switch is actuated contemporaneous with or immediately after the actuation of the vehicle ignition. A thief who is unaware of the existence of the vehicle run switch, or who lacks any access code and/or key required for actuation of the vehicle run switch, will be unable to trigger the vehicle run switch and, as a result, the cut-off valve will close causing the vehicle engine to stall. In this regard, the system of the present invention will deter theft of a motor vehicle which is parked or unattended.

Further in accordance with the invention, the system may incorporate a driver's seat switch or sensing apparatus operative to sense when a human body is seated in the driver's seat. If the driver's seat sensing apparatus determines that the driver's body is removed from the driver's seat for more than a predetermined minimum time period (e.g., approximately 3 seconds), the controller/timer will begin timing of a delay time period. At the end of the delay time period, the controller/timer will cause the cut-off valve to close, thereby stalling the vehicle engine. In this regard, the delay time period is preferably long enough (e.g., typically 2–4 minutes and preferably about 2–3 minutes) to allow the vehicle to be driven a safe distance away from the scene of the hijacking before the vehicle engine is rendered inoperative.

Further in accordance with the invention, the system preferably incorporates a service/valet switch which may be used by the owner/operator of the vehicle to render the system inoperative during periods when it is desired to permit the vehicle to be operated by other authorized persons, such as service mechanics, parking valets or car wash attendants.

Further objects and advantages of the invention will become apparent to those skilled in the art upon reading and understanding of the following detailed description, and the accompanying drawings.

DETAILED DESCRIPTION OF THE PREFERRED EMBODIMENTS

The following detailed description and the accompanying drawings are provided for purposes of describing and illustrating presently preferred embodiments of the invention only and are not intended to limit the scope of the invention in any way.

Figure 1:
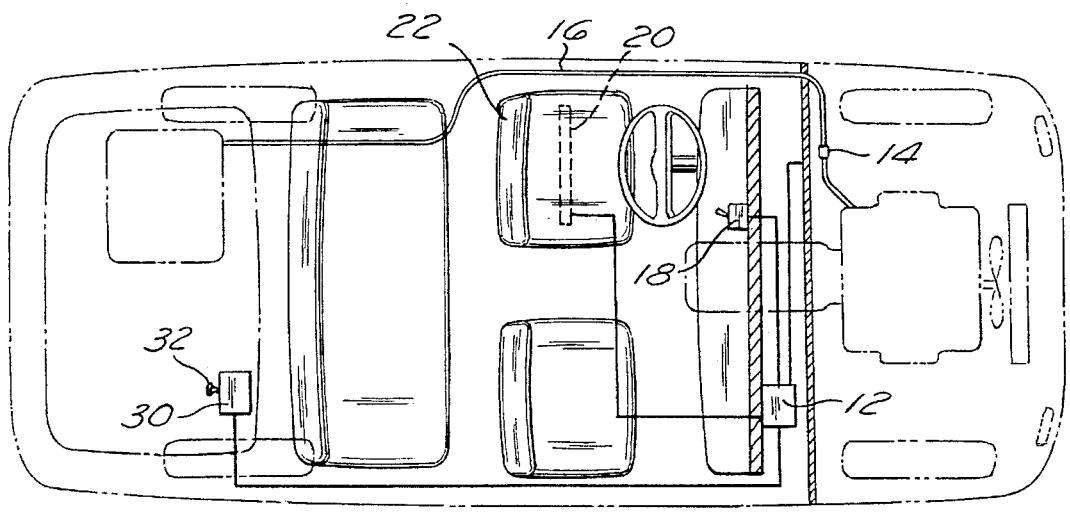
FIG. 1, is a top plan view of a passenger automobile having an anti-theft, anti-hijacking system of the present invention installed therein.

As shown in FIG. 1, the preferred system 10 of the present invention comprises the following components:

- a timer/controller 12;
- a fuel cut-off valve 14 operative to prevent to the flow of fuel to the vehicle engine, said fuel cut-off valve 14 being connected to or communicative with the timer/controller 12;
- a vehicle run switch 18 connected to or communicative with the timer/controller 12, and actuatable by only an authorized owner/operator seated in the driver's seat of the vehicle;
- a driver's seat switch 20 connected to or communicative with the timer/controller 12, and operative to sense when a human body is seated on, or removed from, the vehicle driver's seat 22;
- a service/valet switch connected to or communicative with the timer/controller 12 and/or fuel cut-off valve 14 to allow the rightful owner operator to render the system inoperative, when desired.

As described more fully herebelow, the above-summarized components of the system 10 are installed within a motor vehicle MV, such as a passenger car, and are adapted to interact with one another to prevent or deter theft of the vehicle while it is unattended and to prevent or deter hijacking of the vehicle while it is in routine operation or use.

It is preferable that all wiring and components of the system 10 be installed at locations which are concealed or out of normal view of a thief or hijacker of the vehicle, thereby preventing the thief or hijacker from knowing of the existence of the system 10 in the vehicle.

The fuel cut-off valve 14 preferably comprises an electrically actuated solenoid valve disposed within the fuel line 16 of the vehicle MV, such that closure of the cut-off valve 14 will prevent the flow of fuel to the vehicle engine. The fuel cut-off valve is preferably connected to or in communication with the ignition of the vehicle MV such that, when the ignition switch is activated as to start the vehicle engine, the fuel cut-off valve will close, thereby preventing the vehicle engine from running. In particular, the fuel cut-off valve 14 may comprise a solenoid valve insertable into a standard fuel line, such as that commercially available as Part No. 3X479 from KJP Corporation, 72 Spring Lane, Farmington, Conn. 06032.

The vehicle run switch 18 is preferably positioned within the passenger compartment of the vehicle MV, accessible to a human being seated in the driver's seat 22 of the vehicle MV. The vehicle run switch 18 is preferably hidden from view or concealed such that only the rightful owner/operator of the vehicle MV will have knowledge of its existence. Additionally, or alternatively, the vehicle run switch 18 may incorporate a digital access code, key/lock access, or other user-restrictive feature which limits the ability to actuate the vehicle run switch 18 to persons who are in possession of a specific access code, key or other access information/apparatus required for actuation of the vehicle run switch 18. Also, the vehicle run switch 18 may be mountable in various locations, by way of Velcro™ hook and loop fastening material, or other removable mounting or fastening fixture(s). In particular, the vehicle run switch 18 may comprise a simple finger-depressible, normally open, push-to-close switch of the type commercially available as Part No. NO-1 from Tape Switch Corporation, 100 Schmitt Boulevard, Farmingdale, N.Y. 11735.

The vehicle run switch 18 is connected to or communicative with the fuel cut off valve 14 such that, when the vehicle run switch 18 is activated contemporaneously with or immediately after actuation of the vehicle ignition, the fuel cut-off valve 14 will be caused to remain open or to promptly assume its open position. As a result, the vehicle engine will start and run normally, provided that the vehicle run switch 18 has been actuated contemporaneous with or immediately after turning of the ignition switch. It will be appreciated that, in normally aspirated carburetor-equipped engines, the amount of fuel present in the fuel-line and/or carburetor may enable the vehicle engine to start and run for a brief period of time, even when the fuel cut-off valve 18 is closed. In this regard, it may be advantageous to position the fuel cut-off valve 14 reasonably close to the engine to minimize the amount of residual fuel which will remain between the fuel cut-off valve 14 and the engine.

After the owner/operator has actuated the vehicle run switch 18, and started the vehicle engine, the owner/operator may drive the vehicle in the normal fashion. If, however, the owner/operator of the vehicle is subsequently removed from the driver's seat 22, as would occur during a vehicle hijacking, such removal of the driver's weight from the driver seat 22 will cause a sensing apparatus, such as a driver's seat switch 20, to be actuated. The driver's seat switch 20 is connected to or communicative with the timer/controller 12 and, when actuated, causes the timer/controller 12 to begin timing a predetermined delay period. At the end of the delay period, the timer/controller 12 will cause the fuel cut-off valve 14 to close, thereby stalling the engine and causing the vehicle MV to become inoperative.

The delay period may be any suitable length of time. Preferably, the delay period will be long enough to allow the hijacker to drive a safe distance away from the ejected owner/operator of the vehicle before the fuel cut-off valve 14 is actuated. On the other hand, it is preferable that the second timed period be short enough to stall the vehicle within a reasonably confined distance of the location at which the hijacking occurred, thereby minimizing the area which must be searched in order to locate the stalled vehicle MV. Accordingly, it is presently believed that a delay period in the range of 2–4 minutes will be sufficient in most applications of the invention and, in many geographical areas, a delay period of approximately 2–3 minutes will be preferred.

Figure 2:
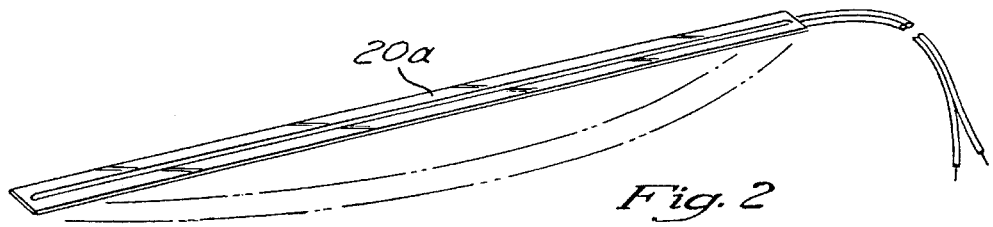
FIG. 2 is a perspective view of a deformation switch which may embody the seat-switch component of the anti-theft, anti-hijacking system of the present invention.
Figure 3:
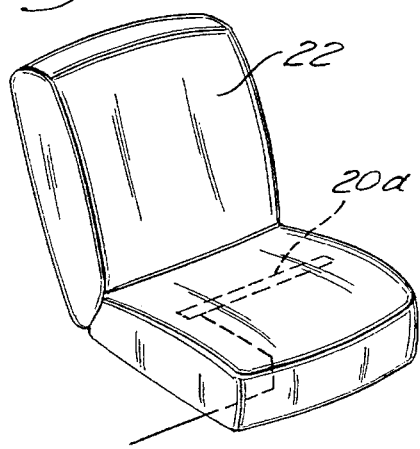
FIG. 3 is a perspective view of an automobile seat having the deformation switch of FIG. 2 operatively installed therein.
Figure 3A:
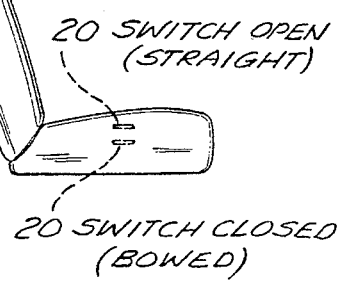
FIG. 3a is a side view of the seat of FIG. 3 showing the manner in which the deformation switch becomes deformed due to the weight of a human body seated on the seat.

The driver's seat switch 20 may comprise any suitable type of switch or sensing device capable of sensing when a human body is seated on the driver's seat 22. One example, of a suitable driver seat switch 20 is a deformation switch 20a of the type shown in FIG. 2. Such deformation switch comprises an elongate pliable body which is disposed within, or connected to, the driver's seat 22 such that, when a human body is seated on the driver's seat 22, the elongate deformation switch 20a will be caused to bow or deform. Thereafter, when the driver's weight is removed from the driver's seat 22, the elongate deformation switch 20a will be allowed to return to its original non-deformed configuration. The circuitry within the deformation switch 20a is such that, when the elongate body of the switch 20a is straight the switch 20a is open, and when the elongate body of the switch 20a is bowed the switch 20a is closed. One such deformation switch is commercially available as model "C" from Tape Switch Corporation, 100 Schmitt Boulevard, Farmingdale, N.Y., 11835. Alternatively, it will be appreciated that the driver's seat switch 20 may comprise various other types of switches, such as compression switches, and/or various other types of sensing devices including but not necessarily limited to photo electric, optical and/or other sensing systems capable of determining when a human body is seated in the driver's seat 22 of the vehicle MV.

The controller/timer 12 is connected to or in communication with the seat switch 20, and is preferably programmed or adapted to begin timing of a predetermined delay period (e.g., 2–4 minutes) whenever the seat switch has assumed its non-deformed (i.e., open) configuration for more than a minimum period of time (e.g, 3 seconds). Thereafter, at the end of the delay period (e.g., 2–4 minutes), the system controller/timer 12 will signal the fuel cut-off valve 14 to close, thereby stalling the vehicle engine and causing the vehicle to become inoperative.

Although, in the preferred embodiment, it is only necessary for the seat switch 20 to be triggered or opened for a specific minimum period of time (e.g., 3 seconds) in order to cause the controller/timer 12 to begin timing of the timed delay period, it will be appreciated that various other minimum time periods, or other patterns of opened/closed positioning of the seat switch 20 may be adopted and utilized as the criteria for signaling the controller/timer to begin the timed delay period.

After the fuel cut-off valve 14 has been closed due to triggering of the driver's seat switch 20 and subsequent expiration to the timed delay period, the restarting of the vehicle engine can only be accomplished by actuating the vehicle run switch 18 contemporaneous with or immediately after actuation of the vehicle ignition switch. Since a hijacker would be unaware of the existence of the vehicle run switch 18 and/or unequipped with the necessary access code, key, or other access information/apparatus required to trigger the vehicle run switch 18, the hijacker would be unable or unequipped to accomplish restarting of the vehicle engine after the fuel cut-off valve 14 has become closed.

An optional service/valet switch 30 may be located in the vehicle trunk, or at some other reasonably accessible location in the vehicle. Such service/valet switch 30 is connected to, or communicative with, the controller/timer 12 and is operative to shut down the entire system, thereby preventing the system 10 from being inadvertently triggered during authorized use of the vehicle MV by persons other than the owner/operator (e.g., mechanics, parking valets, car wash attendants, etc. . . . ). The service/valet key switch 30 may require an access code or key 32 for operation. One example of a commercially available switch usable as the service/valet switch 30, is marked as Part No. SELSWSS201P by Select-A-Switch, Inc., 1200 East Techachapi Boulevard, Techachapi, Calif. 93561. The provision of the service/valet switch 32 will enable the owner/operator to deactuate the entire system 10 prior to leaving the vehicle with a parking valet, service mechanic, car wash attendant, or at any other time when it is desired to render the system 10 inoperative. Thereafter, when desired, the owner/operator of the vehicle may again open the trunk, and utilize the service/valet switch 30 to restore the system 10 to its operative state.

Figure 4:
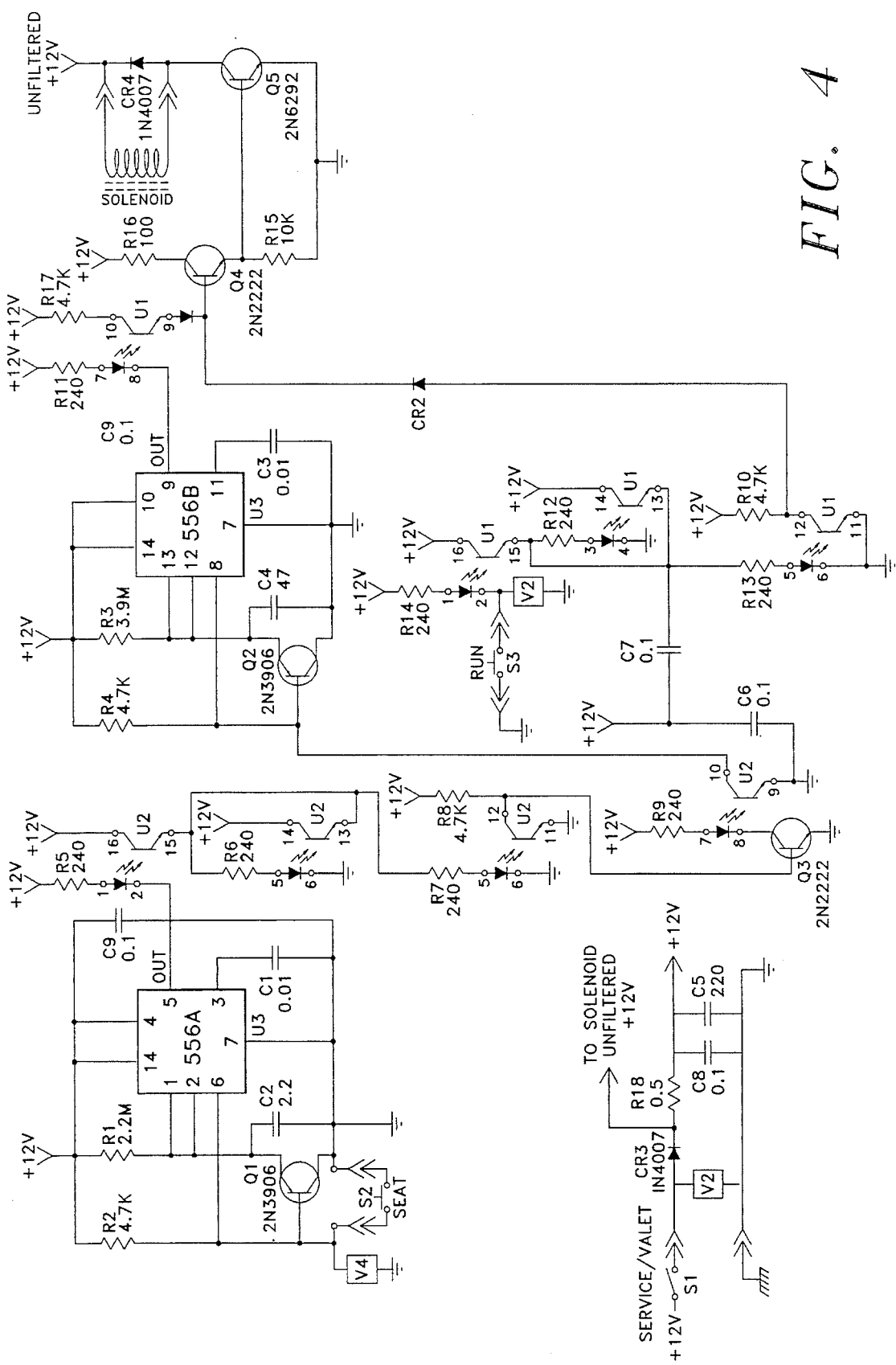
FIG. 4 is an electrical schematic of a preferred anti-theft, anti-hijacking system of the present invention.

It will be appreciated that the system 10 of the present invention may be embodied and effectuated by any electrical circuit designs capable of performing the intended functions of the herein described system 10. One presently preferred example of an electrical circuit for the system 10 is shown in FIG. 4.

METHOD OF USE

Figure 5:
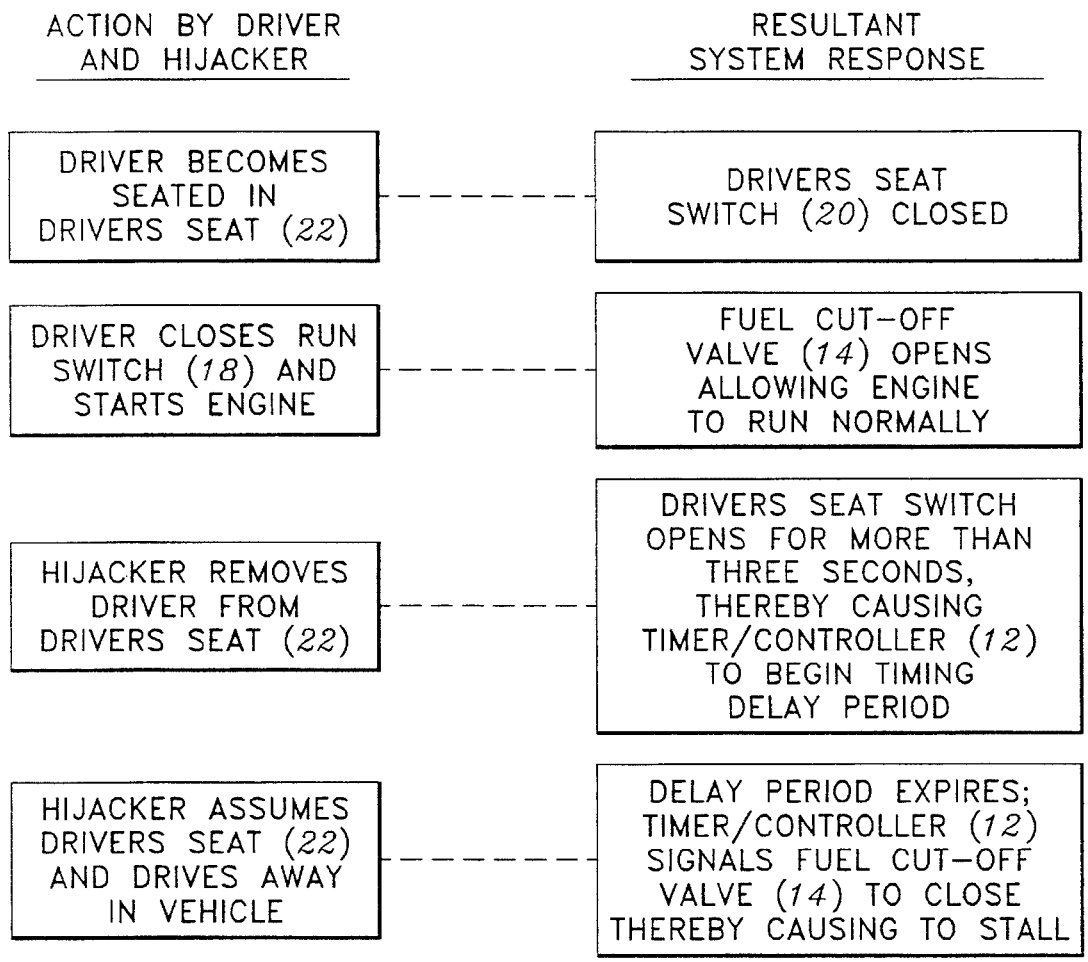
FIG. 5 is a block diagram of a method by which the system of the present invention deters or prevents hijacking of a motor vehicle.

FIG. 5 is a block diagram showing the preferred methodology by which the system 10 of the present invention operates to prevent hijacking of a motor vehicle during use.

With reference to FIG. 5, the rightful owner/operator initially becomes seated in the driver's seat 22, thereby causing the driver's seat switch 20 to assume its closed position. Thereafter, the owner/operator turns the vehicle ignition on and, contemporaneously therewith or immediately thereafter, volitionally triggers the vehicle run switch 18. Because the vehicle run switch 18 has been actuated, the fuel cut-off valve 14 remains open or immediately becomes open and the vehicle engine is allowed to run normally.

When a hijacker removes the owner/operator from the driver's seat 22, the driver's seat switch 20 will move to its open position. When the driver's seat switch 20 has been open for more than the selected minimum time period (e.g., approximately 3 seconds) the controller/timer 12 will begin to time the pre-selected delay period (e.g., generally 2–4 minutes and preferably about 2–3 minutes). At the end of the delay period, the controller/timer 12 will cause the fuel cut-off valve to close, thereby causing cessation of the flow of fuel to the vehicle engine and rendering the vehicle inoperative.

Although the system and method of the present invention have been described hereabove with reference to certain presently preferred embodiments, it will be appreciated that various additions, deletions, modifications an alterations may be made to the above-described embodiments without departing from the intended spirit and scope of the invention. For example, the cut-off valve may be positioned to stop the flow of some fluid, other than fuel, required for normal operation of the vehicle. Similarly, the fuel cut-off valve may be replaced by a switch in the vehicle electrical system which would stop the running of the vehicle engine by preventing the ignition of fuel/air mixture within the vehicle engine. Also, in electric-powered vehicles, the cut-off valve may comprise a switch which would cut-off the flow of electrical power to the vehicle engine. Accordingly, it is to be understood that all such additions, deletions, modifications and alterations are to be included within the scope of the following claims.

What is claimed is:

1. A system for preventing the theft or hijacking of a motor vehicle having an engine and a driver's seat, said system comprising:

a fuel cut-off valve operative to stop the flow of fuel to the vehicle engine, said fuel cut-off valve being in communication with the vehicle ignition such that when the vehicle ignition is actuated, said fuel cut-off valve will stop the flow of fuel to the engine;

a vehicle run switch in communication with said fuel cut-off valve, said vehicle run switch being operative to prevent said fuel cut-off valve from stopping the flow of fuel when said vehicle ignition is actuated;

a driver's seat sensing apparatus operative to sense when a driver's body has been removed from the driver's seat of the vehicle;

a control apparatus in communication with said driver's seat sensing apparatus and said cut off valve, said control apparatus being operative to time a predetermined delay period after said seat sensing apparatus determines that the driver's body had been removed from the driver's seat for a minimum time period, and to cause said fuel cut off valve to stop the flow of fuel to the vehicle engine at the end of said predetermined delay period.

2. The system of claim 1 wherein said fuel cut off valve comprises a solenoid valve.

3. The system of claim 1 wherein said control apparatus comprises an electronic circuit which includes an electronic clock.

4. The system of claim 1 wherein said timed delay period is 2–4 minutes.

5. The system of claim 1 wherein said timed delay period is approximately 2–3 minutes.

6. The system of claim 1 wherein said vehicle run switch comprises a switch constructed and configured to be actuated by finger pressure.

7. The system of claim 1 wherein said vehicle run switch comprises a switch configured and constructed to be actuated by entry of an access code.

8. The system of claim 1 wherein vehicle run switch is configured and constructed to be actuated by use of a key.

9. The system of claim 1 wherein said vehicle run switch is attachable to the vehicle at various locations by way of a releasable connector means.

10. The system of claim 9 wherein said releasible connector means comprises corresponding pieces of hook and loop connector material.

11. The system of claim 1 wherein said sensing apparatus comprises a switch associated with the driver's seat, said switch being movable between a closed position when a driver's body is seated on the driver's seat and an open position when a driver's body is removed from the driver's seat.

12. The system of claim 11 wherein a switch comprises a deformation switch which deforms in response to placement of weight, approximating the weight of a human body, on the driver's seat.

13. The system of claim 11 wherein said switch is a compression-actuated switch which becomes compressed when weight, approximating the weight of a human body, is placed on the driver's seat of the vehicle.

14. The system of claim 1 wherein said "change indicative of a hijacking" comprises:

removal of human body weight from the driver's seat.

15. The system of claim 1 wherein said "change indicative of a hijacking" comprises:

removal of human body weight from the driver's seat for at least a predetermined minimum period of time.

16. The system of claim 1 wherein said predetermined minimum period of time is approximately 3 seconds.

17. The system of claim 1 further comprising:

a service/valet switch whereby the system may be rendered inoperative.

18. The system of claim 17 wherein said vehicle has a trunk, and wherein said service valet switch is located in the trunk of said vehicle.

19. The system of claim 17 wherein said service/valet switch requires an access code.

20. The system of claim 17 wherein said service/valet switch requires a key.

21. The system of claim 1 wherein said fuel cut-off valve is replaced by a switch operative to stop the running of the vehicle engine by preventing the flow of electrical energy to the vehicle engine.

22. A method for preventing the hijacking of a motor vehicle having an engine and a driver's seat, said method comprising the steps of:

(a) providing a cut-off valve operative to stop the running of the vehicle engine;

(b) providing a sensor apparatus for sensing when a driver is seated in the driver's seat of the vehicle;

(c) providing a hijack criteria which, when sensed by said sensing apparatus, will be taken as an indication that the vehicle has been hijacked;

(d) providing a control apparatus in communication with said sensing apparatus and said cut-off valve, said control apparatus being operative to begin timing a predetermined delay period when said sensing apparatus senses said hijack criteria, and to cause said cut-off valve to stop the running of the vehicle engine at the end of said predetermined delay period;

(e) sensing, via said sensor apparatus, when a driver has been removed from the driver's seat of the vehicle, and thereby causing said control apparatus to time said predetermined delay period, and to subsequently cause said cut-off valve to stop the running of the vehicle engine, at the end of said delay period.

23. The method of claim 22 wherein step (a) comprises:

providing a fuel cut-off valve in a fuel line which carries fuel to the vehicle engine.

24. The method of claim 22 wherein step (a) comprises:

providing a solenoid valve in a fuel line which carries fuel to the vehicle engine.

25. The method of claim 22 wherein step (a) comprises:

providing a fuel cut-off valve which resides entirely within a fuel line which carries fuel to the vehicle engine.

26. The method of claim 22 wherein step (a) comprises:

providing a switch operative to stop the flow of electrical energy to the vehicle engine.

27. The method of claim 22 wherein step (b) comprises:

providing a driver's seat switch operative to sense when the weight of a human being is seated on the driver's seat.

28. The method of claim 22 wherein step (b) comprises:

providing a deformation switch in association with the driver's seat, said deformation switch being configured and constructed to assume a straight non-deformed configuration when the driver's seat of the vehicle is empty and a deformed configuration when a human being is seated on the driver's seat of the vehicle.

29. The method of claim 22 wherein the hijack criteria defined in step (c) comprises:

removal of a human body from the driver's seat for more than a minimum period of time.

30. The method of claim 29 wherein said minimum period of time is 2–5 seconds.

31. The method of claim 29 wherein said minimum period of time is approximately 3 seconds.

32. The method of claim 22 further comprising the step of:

(g) causing the components provided steps (a)–(d) to be sufficiently concealed from view as to be undetectable by a hijacker seated in the driver's seat of the vehicle.

33. The method of claim 22 wherein the predetermined delay period in step (d) is 2–4 seconds.

34. The method of claim 22 wherein the predetermined delay period in step (d) is 2–3 seconds.

35. The method of claim 22 wherein the predetermined delay period provided in step (d) is sufficiently long to allow the vehicle to be driven by a hijacker to a safe distance away from the location at which the hijack criteria was first sensed in step (c).

36. A method for preventing the theft of a motor vehicle having an engine, an ignition, a fuel conduit which carries fuel to the engine, and a driver's seat, said method comprising the steps of:

(a) providing a cut-off valve operative to prevent the running of the vehicle engine;

(b) providing a vehicle run switch which, when actuated contemporaneous with or immediately after actuation of the vehicle ignition, will cause said cut-off valve to be open, thereby permitting said vehicle engine to run;

(c) in the event that the vehicle ignition is actuated without actuation of said vehicle run switch, causing said cut-off valve to close, thereby preventing said vehicle engine from running.

37. The method of claim 36, further comprising additional steps for preventing hijacking of the motor vehicle while the vehicle engine is running, said additional steps comprising:

(d) providing a sensing apparatus for sensing when a driver is seated in the driver's seat of the vehicle;

(e) providing a hijack criteria which, when sensed by said sensing apparatus, will be taken as an indication that the vehicle has been hijacked;

(f) providing a control apparatus in communication with said sensing apparatus and said cut-off valve, said control apparatus being operative to begin timing a predetermined delay period when said sensing apparatus senses said hijack criteria, and to cause said cut-off valve to stop the running of the vehicle engine at the end of said predetermined delay period;

(g) sensing, via said sensor apparatus, when a driver has been removed from the driver's seat of the vehicle, and thereby causing said control apparatus to time said predetermined delay period, and to subsequently cause said cut-off valve to stop the running of the vehicle engine, at the end of said delay period.

38. The method of claim 37 wherein step (a) comprises:

providing a fuel cut-off valve in a fuel line which carries fuel to the vehicle engine.

39. The method of claim 37 wherein step (a) comprises:

providing a solenoid valve in a fuel line which carries fuel to the vehicle engine.

40. The method of claim 37 wherein step (a) comprises:

providing a fuel cut-off valve which resides entirely within a fuel line which carries fuel to the vehicle engine.

41. The method of claim 37 wherein step (a) comprises:

providing a switch operative to stop the flow of electrical energy to the vehicle engine.

42. The method of claim 37 wherein step (b) comprises:

providing a driver's seat switch operative to sense when the weight of a human being is seated on the driver's seat.

43. The method of claim 37 wherein step (b) comprises:

providing a deformation switch in association with the driver's seat, said deformation switch being configured and constructed to assume a straight non-deformed configuration when the driver's seat of the vehicle is empty and a deformed configuration when a human being is seated on the driver's seat of the vehicle.

44. The method of claim 37 wherein the hijack criteria defined in step (c) comprises:

removal of a human body from the driver's seat for more than a minimum period of time.

45. The method of claim 39 wherein said minimum period of time is 2–5 seconds.

46. The method of claim 39 wherein said minimum period of time is approximately 3 seconds.

* * * * *